United States Patent
Nass et al.

(10) Patent No.: US 6,319,612 B1
(45) Date of Patent: Nov. 20, 2001

(54) GLASS AND GLASS CERAMIC PLATES WITH ELEVATED THERMAL STABILITY AND PROCESS FOR THEIR PRODUCTION

(75) Inventors: Peter Nass, Mainz; Roland Dudek, Bad Kreuznach; Juergen Naubik, Eich, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/249,795

(22) Filed: Feb. 16, 1999

(30) Foreign Application Priority Data

Feb. 13, 1998 (DE) .............................. 198 05 907

(51) Int. Cl.$^7$ .................................................. C03B 25/00
(52) U.S. Cl. .............................. 428/410; 65/115; 65/117; 264/235; 264/346; 219/464
(58) Field of Search ........................... 428/410; 219/464; 65/117, 115, 118, 119, 120; 264/234, 235, 346

(56) References Cited

U.S. PATENT DOCUMENTS

| | | | |
|---|---|---|---|
| 3,840,360 | * | 10/1974 | Wright et al. . |
| 3,853,674 | * | 12/1974 | Levene . |
| 4,826,522 | * | 5/1989 | d'Iribarne et al. . |
| 5,700,306 | * | 12/1997 | Maltby, Jr. et al. . |

FOREIGN PATENT DOCUMENTS

| | | |
|---|---|---|
| 899402 | 12/1953 | (DE) . |
| 1 421 824 | 1/1960 | (DE) . |
| 0 241 356 | 10/1987 | (EP) . |

OTHER PUBLICATIONS

English Abstract of DE 1,421,824.
English Abstract of EP 0,241,356.
English Abstract of DE 899,402.

* cited by examiner

Primary Examiner—Deborah Jones
Assistant Examiner—Wendy Boss
(74) Attorney, Agent, or Firm—Millen, White, Zelano & Branigan, P.C.

(57) ABSTRACT

Glass or glass ceramic plates with elevated thermal resistance and process for their production. After cooling, the glass or glass ceramic plates are subjected to zone annealing, whereby the plates are divided into two zones in which annealing is done at respectively different temperatures, and whereby the zones with the elevated temperature correspond, during annealing, to the sub-areas of the finished glass or glass ceramic plates in which compression stress builds up after uneven heating corresponding to the respective specific application of the glass or glass ceramic plates. The glass or glass ceramic plates that are obtained are thus characterized in that they are divided into two sub-areas, whereby one sub-area exhibits structural compression and the other sub-area exhibits compression stress. Glass or glass ceramic plates that are resistant to breakage that is caused by uneven heating result.

16 Claims, No Drawings

GLASS AND GLASS CERAMIC PLATES WITH ELEVATED THERMAL STABILITY AND PROCESS FOR THEIR PRODUCTION

BACKGROUND OF THE INVENTION

Mechanical stresses in the form of compression or tensile stresses are produced with uneven heating over the surfaces of flat or curved glass or glass ceramic plates. The level of these stresses depends on the temperature distribution on the plate and on physical material properties, such as, e.g., thermal expansion coefficients, the modulus of elasticity, heat conductivity, etc. If the tensile or compression stresses exceed the maximum permissible limits that are set by the strength of the plate, the plate will break.

Plates of this kind that are made of glass or glass ceramic with unevenly heated areas are used as, e.g., stove cooking surfaces (electric, gas, induction and solid-fuel stoves), grilling surfaces, light covers, heating element covers, etc.

In principle, the glass or glass ceramic plates can have a positive or a negative thermal expansion coefficient. If the thermal expansion coefficient is negative in the temperature range in question, which should be the exception rather than the rule, then tensile stresses will arise in the flat areas of the plate, where the latter is heated. Conversely, in the case of positive thermal expansion coefficients, which occur more frequently, the tensile stress arises in the colder edge areas that adjoin the heated areas, which can make these edge areas vulnerable to breaking. Moreover, because of the mechanical machining of the edge, the edge area of a plate in any case has lesser strength. The risk of breakage being caused by the tensile stresses that arise, especially in the less strong edge areas, means that certain materials are ruled out for some of the above-indicated possible applications or can be used only for a relatively narrow temperature range.

To overcome these drawbacks, in the previous prior art the glass or glass ceramic was subjected to hardening (prestressing), whereby compression stress was produced in the surface layer of the glass product and tensile stress was produced in the interior. In this case, the compression stresses on the surfaces of the glasses increase their strength since, in the presence of tensile stress, these compression stresses on the surface must first be overcome before the formation of tensile pressure peaks ultimately leads to breakage.

For tempering (prestressing) of glass items, basically two processes are available: thermal tempering and chemical tempering.

With thermal tempering, glasses are heated to just below their softening point and are then quickly cooled. Because the interior of the glass cools more slowly than the surface, the surface is placed under compression stress, while the interior is exposed to tensile stress. Since the effects that occur are greater, the greater the thermal expansion of the glass, this process is limited to materials with fairly large expansion coefficients. Another drawback consists in the fact that the increases in hardness are quickly destroyed when the glass is brought to temperatures of its transformation range, so that the process cannot be used on objects that are exposed during use to temperatures that exceed the relaxation temperature of the thermally tempered (prestressed) glass. Moreover, thermal tempering is less efficient in the case of thin-walled objects.

Chemical tempering is based on a compression prestress being produced in the glass surface by altering its chemical composition relative to the glass interior, whereby surface layers with lower thermal expansion coefficients or larger volumes than the interior of the glass are produced. The chemical tempering method consists of an ion exchange. It has the drawback, however, that it is a comparatively time-consuming and expensive process since only layers that are too thin and are under compression stress are produced within economically justifiable periods. Moreover, the method is limited since it can be used only on glasses of specific chemical composition. Another drawback consists in that the compression stress layer has a chemically tempered glass of typically only a thickness of 100 to 200 $\mu$m, such that the process is limited to applications in which large surface damage would penetrate the compression stress layer, which would obviate the protective action.

SUMMARY OF THE INVENTION

An object of the invention was to make available a process for the production of glass and glass ceramic plates that can be used on items without the above-mentioned limits, and with said such plates the property is imparted that, in the case of uneven heating, they can be exposed to considerably higher temperatures without risk of breakage despite the tensile stress that arises.

Upon further study of the specification and appended claims, further objects and advantages of this invention will become apparent to those skilled in the art.

According to the process, this object is achieved in that, after cooling, the glass or glass ceramic plates are subjected to zone annealing with a defined temperature-time program, whereby in terms of surface area the plates are divided into two zones in which annealing is done at respectively different temperatures, and the zones with the higher temperature during annealing correspond to the sub-areas of finished glass or glass ceramic plates, in which compression stress is built up according to uneven heating corresponding to the respective specific use of the glass or glass ceramic plates. The glass or glass ceramic plates that are obtained are thus characterized in that they are divided into two sub-areas, whereby one sub-area exhibits structural compression and the other sub-area exhibits compression stress.

In this case, as is common to the specialty in question, annealing is defined as the subsequent heat treatment of a glass product (glass or glass ceramic plate) that is carried out according to a specific temperature-time program in a furnace that operates continuously or periodically for the purpose of modifying the material and/or product parameters.

Structural compression is achieved with the annealing of the sub-areas of the glass or glass ceramic plates that is carried out at elevated temperatures, which causes compression stress to build up in the adjacent areas that are annealed at lower temperatures, and the structural imbalance that is created is maintained permanently in the then finished glass or glass ceramic plates. If during use the area that is provided for heating is heated to the operating temperature, then, e.g., in the case of a material with positive heat expansion, the compression stresses that are produced thermally (and/or mechanically) and that occur in the nonheated areas are completely or partially compensated for by the "frozen compression stresses" there, such that compression stress peaks that result in breakage can no longer occur.

The individual requirements that are imposed on the material that is used for the glass or glass ceramic plate consist in that, on the one hand, the material must be "compatible," i.e., during the beginning of the cooling process, the material-specific large-volume glass structure that is initially present must be caused to "freeze" by a cooling process, and said glass structure is then further compressed ("compacted") in later annealing or zone annealing and, on the other hand, it must be possible during the annealing process to achieve a (material-dependent) maximum temperature that exceeds the later operating temperature.

Before the actual zone annealing, the glass or glass ceramic plate must first be toughened and cooled if it has not been already. For toughening and cooling, the plate in question is brought to a temperature that is higher than or equal to transformation temperature $T_g$ of its material, e.g., up to about 150° C. above $T_g$, and then said plate is cooled quickly to a temperature that is below $T_g$. The faster the cooling speed (temperature reduction per unit of time), the better the result. For example, cooling can be effected by blowing cold air through air jets onto the material.

During the actual zone annealing, the zones that are to be annealed at the elevated temperatures are heated to a temperature that must lie below the maximum temperature that was achieved during the toughening and cooling. The larger the surface ratio of the zones that are to be annealed at elevated temperatures to the total surface of the plate, the higher the compression stress that builds up in the zones that are to be annealed at the lower temperature (in the case of positive heat expansion). The zone that is to be annealed at elevated temperature, which undergoes structural compression, can be a single interconnected zone or, as in, e.g., a hot plate with several cooking surfaces, can consist of several sub-zones that are not connected together and that are distributed over the surface of the plate. The value of the compression stress that can be achieved increases with the annealing time (holding time), i.e., the time during which the two zones of their respective different temperatures are exposed to annealing. For reasons of cost-effectiveness, a compromise can be found. Reasonable annealing times with technically satisfactory results should lie in the range of 30 to 120 hours.

The temperatures for annealing in the two zones will depend upon the type of glass or glass ceramic used and the ultimate application thereof. For example, when used as a cooking range top, a glass ceramic material is treated so that it can withstand temperatures up to 350° C.

Zone annealing technically can be performed such that, e.g., the entire plate is introduced horizontally into a uniformly heated furnace, whereby the heating temperature of the furnace corresponds to the temperature of the zones that are to be used for the production of compression stress and that are to be annealed at lower temperature. The creation of the zones that are to be annealed at the elevated temperature is thus achieved in that, corresponding to the position of these plates, the heating elements that can be adjusted separately and are mounted on the top and/or bottom side of the plates supply the heat that corresponds to annealing at the elevated temperature.

The invention is now explained in more detail based on the following examples. The temperatures that are to be set vary basically within the above-indicated limits.

The entire disclosure of all applications, patents and publications, cited above and below, and of corresponding German Application No. 198 05 907.8-45, filed Feb. 13, 1998 is hereby incorporated by reference.

In the foregoing and in the following examples, all temperatures are set forth uncorrected in degrees Celsius; and, unless otherwise indicated, all parts and percentages are by light.

EXAMPLE 1

A 4 mm-thick, flat glass ceramic plate (SCHOTT-Code 85768) with a thermal expansion coefficient of about $1 \times 10^{-6}$/K is subjected to specific zone annealing.

The glass ceramic plate is first cooled by being initially heated to a temperature of 830° C. and is then cooled down to below 600° C. at a cooling rate of at least 100 K/min. (The cooling process is omitted if the plate from a conventional production process is already present in the cooled state.)

Since the center area is to be used as a heating zone in the finished glass ceramic plate, zone annealing is carried out in such a way that this portion is heated to 750° C., while the outside edge area that surrounds this area is heated only to 600° C. The duration of annealing is 90 hours. The ratio of the inside "heating zone" to the overall plate surface is 0.4.

After the annealing process has ended, compression stress is present in the edge area of the plate at a level of about 15 MPa. If this plate is now used as a cooking surface with the inside area as a heating zone, the tensile stress that is then manifested in the edge area is reduced during heating by exactly the amount of the "frozen" compression stress. The glass ceramic plates that are subjected to zone annealing can therefore be heated in the heating zone to considerably higher temperatures than is possible for non-annealed glass ceramic plates. The maximum permissible temperature for the annealed plate was approximately 508° C., while it was only approximately 373° C. for the non-annealed glass ceramic plate.

EXAMPLE 2

A 2 mm-thick, flat glass ceramic plate (SCHOTT borosilicate glass 3.3 "borofloat 33") with a thermal expansion coefficient of about $3.3 \times 10^{-6}$/K is subjected to specific zone annealing.

The glass plate is first cooled by being initially heated to a temperature of 700° C. and then cooled down to below 400° C. at a cooling rate of at least 100 k/min.

The finished glass plate is to be used as a cover glazing for heating, where it is strongly heated in the center area. Zone annealing is therefore carried out again in such a way that this portion is heated to 550° C. because of the positive thermal expansion, while the outside edge area that surrounds this area is heated only to 450° C. The duration of annealing is 50 hours. The ratio of the inside "heating zone" to the overall plate surface is 0.4.

After the annealing process has ended, compression stress is present in the edge area of the plate at a level of about 13 MPa, which again counteracts the compression stress that is created in the outside area when the glass plate is used as directed. The maximum permissible temperature for the annealed plate was approximately 146° C., while it was only approximately 93° C. for the non-annealed glass plate.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the production of a glass or glass ceramic plate with great resistance to breakage caused by uneven heating, wherein a glass or glass ceramic plate produced according to a conventional process including tempering is subjected to zone annealing after cooling, by exposing two different areas of the plate defining two annealing zones to a different temperature, such that the zone subjected to the respectively higher temperature is the one in the finished plate corresponding to the area where compression stress then develops in its respective specific application during uneven heating.

2. A process according to claim 1, wherein in the case of a plate that consists of a material with positive thermal expansion, the zone subjected to the respectively higher temperature is the one corresponding in the finished plate to the area that then undergoes elevated heating in its respective specific application.

3. A process according to claim 1, wherein the zone annealed at higher temperature is heated to a temperature below the maximum temperature that is reached during tempering.

4. A process according to claim 1, wherein the plate that is to be annealed is introduced into a uniformly heated furnace, whose temperature corresponds to the temperature that is provided for the zone to be annealed at a lower temperature, and the additional temperature for the zone to be annealed at the higher temperature is supplied via heating elements that can be adjusted separately and are mounted on the top and/or bottom side of the plate corresponding to the zone.

5. A process according to claim 1, wherein the plate that is to be annealed is introduced into a uniformly heated furnace, whose temperature corresponds to the temperature that is provided in the zone to be annealed at elevated temperature, and the lower temperature for the zone to be annealed at the lower temperature is supplied by cooling elements that are attached on the upper side and/or the lower side of the plate corresponding to the zone.

6. A process according to claim 1, wherein the annealing zone that corresponds to sub-areas in the plate which undergo greater heating in application is divided into two or more sub-zones that are interconnected and are not distributed over the surface of the plate.

7. A process according to claim 1, wherein the annealing zone that corresponds to sub-areas in the plate which undergo greater heating in application is divided into two or more sub-zones distributed over the plate surface and not connected to one another.

8. The process of claim 1, wherein the tempering is conducted by bringing the plate to a temperature higher than or equal to its transformation temperature, $T_g$, and then cooling it quickly to a temperature below its $T_g$.

9. The process of claim 1, wherein the annealing time is from 30 to 120 hours.

10. The process of claim 1, wherein the annealing in the zone subjected to the higher temperature is conducted at a temperature of 350° C. or higher.

11. A glass or glass ceramic plate with high resistance to breakage caused by uneven heating of one sub-area to elevated temperature and another sub-area to lower temperature, wherein said plate is divided into two sub-areas, with one sub-area exhibiting structural compression and the other sub-area exhibiting compression stress.

12. A glass or glass ceramic plate according to claim 11, wherein said plate consists of a material with a positive thermal expansion, and the sub-area with structural compression is the area that is to be exposed during uneven heating to elevated temperature and the sub-area with compression stress is the area that is to be exposed during uneven heating to lower temperature.

13. A glass or glass ceramic plate according to claim 11, wherein said plate consists of a material with negative thermal expansion, and the sub-area with structural compression is the area that is exposed during uneven heating to lower temperature, and the sub-area with compression stress is the area that is to be exposed during uneven heating to elevated temperature.

14. A glass ceramic plate according to claim 12, wherein said plate is a stove cooking surface and the sub-area with structural compression represents one or more heating surfaces.

15. A glass or glass ceramic plate prepared according to the process of claim 1.

16. The glass or glass ceramic plate of claim 11, which is a glass ceramic plate for a cooking surface and is resistant to breakage up to a temperature of 350° C.

* * * * *